United States Patent Office 3,376,327
Patented Apr. 2, 1968

3,376,327
PROCESS OF FORMING ALKALINE EARTH
SOAP COMPOSITIONS
John W. Freeland, 819 W. Fern Drive,
Fullerton, Calif. 92632
No Drawing. Filed Feb. 1, 1965, Ser. No. 429,676
4 Claims. (Cl. 260—413)

ABSTRACT OF THE DISCLOSURE

This invention provides a rapid, simple method of forming a calcium, magnesium, or a mixed calcium-magnesium soap of a fatty acid. The selected fatty acid, such as tall oil fatty acid, is heated to within 90° F. to 150° F., but sufficiently high to liquefy the fatty acid, whereupon finely divided calcium or magnesium oxide or calcium hydroxide or mixtures thereof is added in excess of the equivalent amount, whereupon the temperature of the mix suddenly increases. Before the mix passes from a liquid to a solid state, it is poured onto a horizontal surface, whereupon the mixture suddenly solidifies, and thereafter cools to room temperature. The slabs so formed may be broken into pieces or ground to a powder.

---

This invention relates to a novel process for producing calcium and magnesium soaps of fatty acids in composition form.

An important article of commerce comprises the calcium and magnesium soaps of fatty acids, such as those formed from oleic, stearic and lauric acids, tall oil fatty acids, the fatty acids derived from cotton seed, corn and soy; animal fatty acids, including fatty acids from fish oils; and all of the above, to the extent that they are unsaturated to begin with, before or after partial or complete hydrogenation. Fatty acids of the type described form a well-known group of commercially available materials, widely used in the preparation of soaps of various kinds, especially for industrial use, for greases, rubber lubricants, and the like. They may be described as fatty acids having from 12 to 22 carbon atoms and a titre of not more than 150° Fahrenheit, the latter being the temperature at which the fatty acids liquefy, and include such well-known commercial species as lauric, palmitic, stearic, oleic, linoleic, and like fatty acids.

The usual methods of making calcium and/or magnesium soaps of these fatty acids fall into two groups; those processes in which the soaps are formed by precipitation out of aqueous solution (these soaps of course being water-insoluble); and those processes in which the ingredients are brought together under such conditions that a molten calcium or magnesium soap is formed, which is later allowed to cool. Both types of processes have disadvantages, the first involving operating with relatively large quantities of water and entailing the disadvantages of filtration, thickening, drying and the like. The fusion processes require relatively elaborate equipment and a considerable loss of heat energy, since the temperature required for the fusion of calcium and magnesium soaps of fatty acids is quite high, ranging generally from about 220° Fahrenheit to 550° Fahrenheit.

An object of the present invention is to provide a process for the production of calcium and magnesium (and mixtures thereof) soaps of fatty acids of the type described, in a solid composition form by a simple, quick, economical and effective process which avoids the difficulties entailed in the known precipitation and fusion methods.

Other objects of the invention will appear as the description thereof proceeds.

Generally speaking, and in accordance with an illustrative embodiment of my invention, I select a fatty acid having from 12 to 22 carbon atoms and a titre of not more than 150° Fahrenheit (and the said fatty acid may of course comprise a mixture of several, such as a mixture of partially hydrogenated sardine oil fatty acids and of tall oil fatty acids); and I heat the selected fatty acid to a temperature within the relatively low range of 90° Fahrenheit to 150° Fahrenheit. I prefer the lower portion of the range just recited, viz., about 90° Fahrenheit to 110° Fahrenheit, with the proviso, however, that the temperature selected should be at least sufficient to liquefy the fatty acid, that is to say, the temperature must be no lower than the titre of the fatty acid. The heated fatty acid is contained in a suitable container which is provided with a means of agitation, which may be an ordinary propeller mixer. I then add to the heated fatty acid an alkaline earth compound selected from the class consisting of calcium oxide, calcium hydroxide, magnesium oxide, and mixtures thereof, the said alkaline earth compound being comminuted to at least —100 mesh. The relative amount of the alkaline earth compound used is such as to be from 1.25 to 5 equivalent weights of the fatty acid. The alkaline earth compound is added as quickly as conveniently possible to the fatty acid, and with agitation. It will be found that within a short time, generally from one-half minute to one minute, the temperature of the admixture so-formed suddenly begins to rise. This is first clearly perceptible when the increase in temperature has reached about 20° Fahrenheit increase. I immediately pour the admixture on to a horizontal surface, taking care to do this before the temperature has increased so much that the admixture has passed from a liquid to a solid state. The admixture which now has been poured on to the horizontal surface, which may be to a depth conveniently to about ½ inch, continues to increase in temperature and more or less suddenly solidifies. Thereafter, the temperature gradually decreases again, and I allow the slab of admixture to remain until it has come back to room temperature. The slab may be broken up into pieces for storage or shipment, and eventually, when desired, it may be passed through a suitable mill and ground to the desired fineness. For many types of usage, it may be ground to pass a 100 mesh screen, or even a 200 mesh screen.

It will be observed that because of the ratio of equivalent weights used, my composition contains an excess of the alkaline earth compound used. The excess is considerable stoichiometrically, but from the standpoint of the actual weights involved it is still a minor constituent in the overall composition. Thus, for example, the equivalent weights of many fatty acids which I may use, such as tall oil fatty acids, corn oil fatty acids, oleic acid, and distilled marine fatty acids, is of the order of 280. Since the equivalent weights of calcium oxide, calcium hydroxide and magnesium oxide are 36, 37 and 20 respectively, it will be seen that for 100 pounds of tall oil fatty acid, for example, an equivalent weight of magnesium oxide is 7.1 pounds; and 2.5 times the equivalent weight would then be about 18 pounds of magnesium oxide.

The excess of the alkaline earth compound remains in the composition, and probably contributes to the solidity of the final composition, and the excess probably is what accounts for the remarkable behavior during processing whereby the temperature suddenly starts to rise while the admixture is still fluid, permitting it to be poured out into a slab as has been described. As a working example, I may cite the following:

60 pounds of tall oil fatty acids (which comprise about 50% oleic, 40% linoleic, and 4% linolenic acids, with a titre of about 60° F.) are placed in a 12-gallon open-top fiber drum and heated by circulation with a pump and an electric heating unit to 90° Fahrenheit. 12 pounds of commercial —200 mesh magnesium oxide are added while the fatty acids are agitated with a propeller mixer, the addition being made within about 20 seconds. Agitation is continued, and after about one minute the temperature suddenly commences to rise. The propeller is quickly withdrawn, and the fluid mass poured out onto a steel pan, the temperature at this point having reached about 130° Fahrenheit after pouring, the temperature continues to rise to about 180° Fahrenheit in a period of an additional minute or two, whereupon evolution of heat ceases, the layer of composition is now solid, about ½ inch thick, and it then slowly cools to room temperature. The slab is broken up easily with a hammer into light yellow pieces, and subsequently passed through a hammermill to give a powdered product of about −100 mesh.

It is possible to use a fiber drum as described because of the low temperatures involved in that step of the processing. This enables the use of reclaimed fiber drums, which are quite inexpensive and can simply be discarded after having been used once, thereby minimizing the clean-up problem.

A particular advantage achieved in accordance with my invention is that the desired alkaline earth metal soap is formed under exceedingly mild conditions, so that the fatty acids are not discolored, polymerized, or otherwise affected as they would be by the high temperatures encountered when the fusion process is used. This makes for a very clean, relatively odorless, light-colored composition in the practice of my invention.

For many uses, the composition prepared in accordance with my invention is highly advantageous even though it contains an excess of alkaline earth metal compound. This is the case where it is used for forming water and oil emulsions for many industrial purposes. A use for which the product of my invention is especially adapted is in oil base fluids used in fracturing oil well formations, and in other operations connected with oil well drilling such as drilling fluids, packer fluids, and the like.

It will be understood that the term "fatty acid" includes mixed fatty acids, and indeed, that will be the usual case since the commercial fatty acids available at reasonable cost are all more or less mixtures, usually of several closely related types. Thus, commercial "oleic acid" normally contains fatty acids in the approximate ratio of about 80% oleic, 10% linoleic, 1% linolenic, 4% palmitic, and 5% stearic acids. Commercial palm fatty acids correspond to a ratio of about 45% palmitic, 2% myristic, 4% stearic, 43% oleic, and 6% linoleic acids. Considering the relatively low cost of these commercial fatty acids, they are remarkably pure, generally running 96% to 99% actual fatty acids, the impurities not interfering with the inventive process, so that no need exists to utilize chemically pure "reagent grade" fatty acids, which would be exorbitant in cost. As an example, commercial grade steam-refined tall oil fatty acid contains only 1% or even less of rosin acids.

While I have described my invention with the aid of numerous examples, it will be apparent that variations are possible in composition, relative propportions, processing times and temperatures, and the like, all within the scope of the invention, as disclosed and as set forth in the claims which follow.

I claim:
1. The process of forming a fatty acid soap composition comprising:
   (a) heating a fatty acid having from 12 to 22 carbon atoms and a titre of not more than 150° F. to a temperature within the range of 90° F. to 150° F. but not lower than the titre of said fatty acid;
   (b) agitating said heated fatty acid and at the same time adding a comminuted solid alkaline earth compound selected from the class consisting of calcium oxide, calcium hydroxide, magnesium oxide, and mixtures thereof so as to form a liquid admixture,
   (c) the amount of said added alkaline earth compound being from 1.25 to 5.0 equivalent weights of said fatty acid,
   (d) continuing said agitation until the temperature of said liquid admixture has increased by at least about 20° F.,
   (e) pouring the liquid admixture from step (c) onto a horizontal surface so as to form a slab; and
   (f) thereafter allowing said slab to cool to room temperature.
2. The process of claim 1 wherein said fatty acid is tall oil fatty acid and said alkaline earth metal compound is magnesium oxide.
3. The process of forming a fatty acid soap composition comprising:
   (a) heating a fatty acid having from 12 to 22 carbon atoms and a titre of not more than 150° F. to a temperature within the range of 90° F. to 150° F. but not lower than the titre of said fatty acid;
   (b) agitating said fatty acid and at the same time adding a comminuted solid alkaline earth compound selected from the class consisting of calcium oxide, calcium hydroxide, magnesium oxide, and mixtures thereof so as to form a liquid admixture,
   (c) the amount of said added alkaline earth compound being from 1.25 to 5.0 equivalent weights of said fatty acid,
   (d) continuing said agitation until the temperature of said liquid admixture has increased by at least about 20° F.,
   (e) pouring the liquid admixture from step (c) onto a horizontal surface so as to form a slab; and
   (f) thereafter allowing said slab to cool to room temperature, and
   (g) thereafter comminuting said slab to form a powdered alkaline earth metal fatty acid soap.
4. The process of claim 3 wherein the fatty acid is tall oil fatty acid and said alkaline earth metal compound is magnesium oxide.

References Cited
UNITED STATES PATENTS

| | | | |
|---|---|---|---|
| 2,890,232 | 6/1959 | Rogers et al. | 260—413 X |
| 904,520 | 11/1908 | Ellis | 260—413 X |

NICHOLAS S. RIZZO, *Primary Examiner.*

ALEX MAZEL, *Examiner.*

JOSEPH A. NARCAVAGE, *Assistant Examiner.*